United States Patent [19]

Tödter

[11] Patent Number: 4,627,262

[45] Date of Patent: Dec. 9, 1986

[54] DEVICE FOR OPENING THE ROLL NIP IN AN APPARATUS COMPRISING A PAIR OF ROLLERS

[75] Inventor: Heinrich Tödter, Nienhagen, Fed. Rep. of Germany

[73] Assignee: Hermann Berstorff Maschinenbau GmbH, Hanover, Fed. Rep. of Germany

[21] Appl. No.: 662,638

[22] Filed: Oct. 19, 1984

[30] Foreign Application Priority Data

Oct. 24, 1983 [DE] Fed. Rep. of Germany ....... 3339168

[51] Int. Cl.⁴ ............................................ B21B 31/24
[52] U.S. Cl. ................................................... 72/248
[58] Field of Search ........................ 72/21, 35, 36, 248

[56] References Cited

U.S. PATENT DOCUMENTS 1,900,032  3/1933  Worthington ........................ 72/248
3,415,097 12/1968  Wheeler ............................... 72/248

FOREIGN PATENT DOCUMENTS 839712  5/1952  Fed. Rep. of Germany .
2123507  5/1975  Fed. Rep. of Germany .
947770  7/1949  France .

*Primary Examiner*—Francis S. Husar
*Assistant Examiner*—Robert Showalter
*Attorney, Agent, or Firm*—Schwartz, Jeffery, Schwaab, Mack, Blumenthal & Evans

[57] ABSTRACT

A device for rapidly increasing the roll nip in an apparatus comprising a pair of rolls such as a calender for plastics material or rubber or a rolling mill is disclosed. The device engages with spindles which are normally present in such apparatuses for ensuring parallel adjustment of the roll nip. The device comprises an auxiliary drive in the form of hydraulic cylinders or the like which activate lever arms connected to a disc member. The disc-shaped member meshes with the spindle. The spindle also carries an external screw-thread which threadedly engages with a spur wheel. On rotation of the disc member, the spindles move up the thread on the spur wheel. Since the spindles are connected to bearing blocks for one of the rolls, the rolls execute an axial, lifting movement and, in consequence, the roll nip is rapidly increased.

5 Claims, 2 Drawing Figures

DEVICE FOR OPENING THE ROLL NIP IN AN APPARATUS COMPRISING A PAIR OF ROLLERS

FIELD OF THE INVENTION

The present invention relates to a device for opening the roll nip in an apparatus which comprises a pair of rolls. The apparatus may be a calender for plastics material or rubber or may be a rolling mill.

BACKGROUND OF THE INVENTION AND DISCUSSION OF PRIOR ART

A typical apparatus having a pair of rolls is a calendering device. In such a device, the ends of, usually, one of the rolls are mounted in bearing blocks. The bearing blocks are engaged by spindles. The spindles have external screw-threads which are engaged by a driven spur wheel. By suitably actuating the spur wheel, the roll nip size can be set.

When such a calender is in use, it is of vital importance that the rolls, which are metallic, do not come into contact with one another. This is because such contact damages the polished roll surfaces and necessitates their replacement. The roll pressures produced in a calender may reach values of between 30 and 150 t per bearing journal. If the rolls contact one another, it is almost inevitable that considerable damage may be sustained by the rolls themselves and by the roll bearings.

A calender for plastics material is disclosed in German Patent Specification No. 2 123 507. Such calender includes a device for preventing the rolls from coming into contact with one another. In such calender, control rods are disposed between the rolls, which rods are entrained by the rolls if and when the roll nip size decreases below a predetermined value. When the control rods are entrained by the rolls, a suitable signal is produced which halts the calendering process.

Such a device is not, however, entirely satisfactory either in terms of its speed of operation or its efficiency in preventing damage to the rolls. This is because it is difficult to ensure that the control rods are entrained by the rolls as they move towards one another. Moreover, annular attachments or shoulder portions need to be provided on the roll journals.

OBJECTS OF THE INVENTION

The present invention seeks to provide a device for opening the roll nip in an apparatus comprising two rolls, such as a calender for plastics material or rubber, which permits the spacing between the two rolls to be very rapidly and reliably to be ensured so that the metallic rolls do not come into contact with one another, even if the calender is inadvertently run empty or even if there is a power failure.

SUMMARY OF THE INVENTION

According to the present invention, there is provided a device for opening the roll nip in an apparatus comprising a pair of rolls such as a calender for plastics material or rubber or a rolling mill, each said roll having a first end and a second, opposed, end; said device comprising bearing blocks for mounting said first and said second ends of one of said rolls, spindle means fixedly connected to each said bearing block, external thread means disposed around said spindle, spur wheel means engageable with said external thread means and drive means for driving said spur wheel means, whereby driving said spur wheel means causes axial adjustment of said spindles and permits setting of the roll nip, and auxiliary drive means co-operating with each said spindle for causing rapid axial adjustment of said spindles.

The spindles are required in any calendering apparatus so that the roll nip can be adjusted. However, by providing them with an auxiliary drive mechanism, the bearing blocks for the roll bearings can be influenced directly without the need for other adjusting means which need some clearance being interposed therebetween, such as the control rods disclosed in the above-referenced German Patent Specification.

A rapid separation of the rolls is only possible when the mechanical adjustment force can act directly upon the bearing blocks. In other words, rapid separation will not occur if additional spur or worm wheels are interposed.

Preferably, said auxiliary drive means comprises meshing means disposed around each said spindle, disc means co-operating with said meshing means on said spindle, arm members fixedly connected to said disc means and piston rod means connected to each of said arm members, each said piston rod means forming part of a piston and cylinder arrangement, and means for actuating each said piston rod, whereby actuation of said piston rods cause rotation of said spindle, said rotation causing co-operation between said spur wheel and said external toothing to cause axial displacement of said spindle and said roll.

A drive of this type permits the adjustment spindles to be rotated very rapidly through a predetermined angle. Accordingly, the bearing blocks for the roll can be raised a few millimetres within a fraction of a second.

This arrangement permits the roll nip of the calender to be altered very rapidly without necessitating the activation of a transmission mechanism having forward and reverse travel and without the need for overcoming thread clearances both of which take too much time to prevent the rolls from contacting one another.

In a preferred embodiment of the invention, a rotary hydraulic cylinder may be used as the means for driving the adjustment spindle. This also rotates the adjustment spindle, which rotation is immediately converted into axial movement of the spindle due to the presence of an external screw thread on the spindle which co-operates with an internal thread on a spur wheel. The bearing blocks, together with the roll, are thus raised immediately.

BRIEF DESCRIPTION OF THE DRAWINGS

A preferred embodiment of the invention will be described further, by way of example, with reference to the accompanying drawings, in which.

Figure 1:
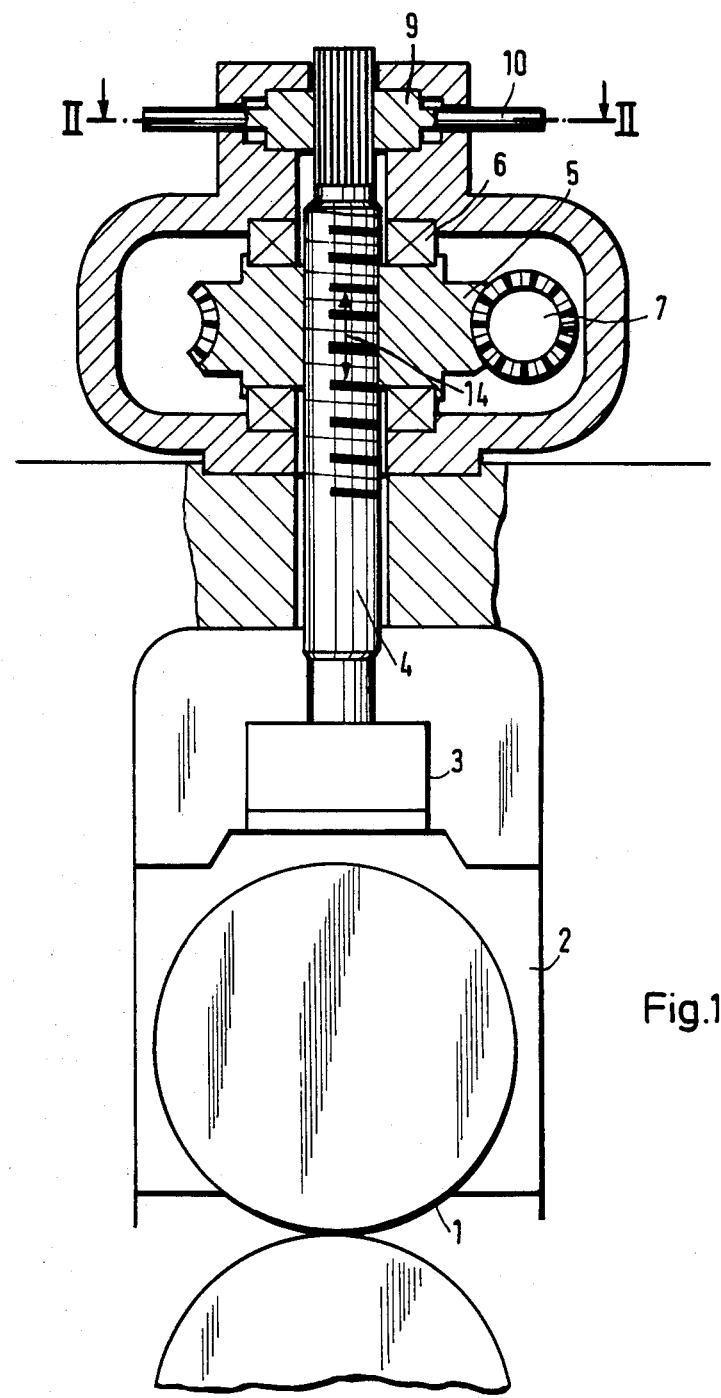
FIG. 1 is an elevational view, partially in section through an adjustment device in accordance with the present invention for setting a roll nip.

In the drawings, there is shown a pair of rolls, one of which is identified by the reference numeral 1. The roll 1 is mounted in bearing blocks 2, the blocks having attachment portions or shoulder members 3.

A spindle 4 is fixedly connected to the attachment portion 3. The spindle has an external screw-thread which co-operates with a corresponding internal screw-thread provided on a spur wheel 5.

Spur wheel 5 is itself mounted in a bearing 6 and caused to rotate by means of worm shaft 7. This rotational motion is transmitted to the external thread of the spindle 4 by means of the internal thread of the spur wheel 5 and this causes an axial displacement of the spindle 4.

In its end region remote from the roll 1, the spindle 4 is provided, on its external surface, with axially-extending toothing or splines 8 which co-operate with corresponding axially extending internal splines or toothing of a disc member 9.

The member 9, which is generally disc-shaped, has two arms 10 secured thereto. The arms 10 are each connected, at their free ends, to piston rods 12 of respective hydraulic piston and cylinder arrangements 13 through the intermediary of connecting and pivot devices 11. Pneumatic cylinders could alternatively be used.

The mode of operation of the above-described device now follows.

In use, material is fed through the roll nip between the two rollers. A roll nip monitoring device (not shown) is used to monitor such passage. The monitoring device may operate by means of laser beams or infra-red rays and provides a signal if the roll nip is not of the desired size. This may occur if there is a risk of the calender running empty or if there is a power failure. The signal produced is used as a switching pulse to activate the hydraulic piston and cylinder arrangements 13.

Figure 2:
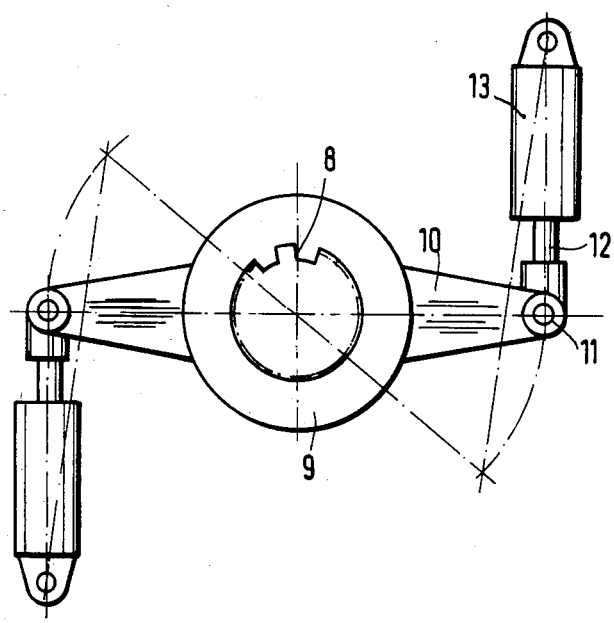
FIG. 2 is a plan view of the device shown in FIG. 1 as would be seen looking along the line II—II and shows an auxiliary spindle drive including hydraulic piston and cylinder arrangements.

The piston rods 12 are thus rapidly extended and, in consequence, the disc 9 executes an anti-clockwise (as shown in FIG. 2) rotational movement by virtue of its connection to the lever arms 10.

This movement causes, in turn, the spindle 4 to be displaced axially in the direction of the double-headed arrow 14 due to the co-operation of the screw-threads of the spindle 4 and spur wheel 5.

Since the spindle 4 is also connected to the bearing block 2, the roll 1 is raised by, for example 2 mm, away from the other roll. Accordingly, the metallic surfaces of the rolls are effectively, and very rapidly, prevented from coming into contact with one another.

If a longer adjustment path is desired the pitch of the external thread on the spindle can be suitably modified. Alternatively, the hydraulic cylinders 13 can be replaced by a rotary hydraulic cylinder which increases the rotational movement of the spindle.

I claim:

1. A device for rapidly opening the roll nip in an apparatus having a pair of rolls such as a calendar or the like, where each roll has first and second opposed ends, comprising:
   (a) bearing blocks for mounting the first and second ends of one of said rolls,
   (b) spindle means fixedly attached to each of said bearing blocks, an intermediate portion of said spindle means being exteriorly threaded,
   (c) an axially fixed spur wheel positioned around each of said spindle means and internally threaded for engaging the threaded portion of said spindle means, and means for rotating said spur wheel, thereby providing axial adjustment of said spindle means for setting the adjustment of the roll nip, and
   (d) auxiliary drive means independent of said spur wheel and directly engaging said spindle means, said auxiliary drive means being constructed and arranged so that when actuated, said auxiliary drive means causes simultaneous, direct and rapid axial movement of both of said spindle means, and thus said bearing blocks, in a direction away from the nip of the rolls, whereby the rolls are maintained out of contact with each other.

2. The device of claim 1, wherein said spindle means is formed with vertical splines axially outwardly spaced from said threaded exterior of said spindle means, and wherein said auxiliary drive means comprises a member configured to directly engage said spline means, and means for rapidly rotating said member to rotate said splines and thus said spindle means relative to said spur wheel, whereby said spindle means and said bearing blocks are rapidly moved in a direction away from said roll nip.

3. The device of claim 1, wherein said member comprises a disc having internal splines and arms extending laterally outwardly from said disc, and wherein said means for rotating said disc comprises piston and cylinder means, the pistons of which are operatively connected to said arms, the actuation of said pistons causing said arms to rotate in the same direction to effect axial displacement of said spindle means away from said roll nips.

4. The device of claim 3, wherein said piston and cylinder means comprises a hydraulic cylinder.

5. The device of claim 3, wherein said piston and cylinder means comprises a pneumatic cylinder.

* * * * *